(12) United States Patent
Wolrich et al.

(10) Patent No.: US 7,328,289 B2
(45) Date of Patent: *Feb. 5, 2008

(54) COMMUNICATION BETWEEN PROCESSORS

(75) Inventors: Gilbert Wolrich, Framingham, MA (US); Debra Bernstein, Sudbury, MA (US); Matthew J. Adiletta, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 481 days.

This patent is subject to a terminal disclaimer.

(21) Appl. No.: 10/931,454

(22) Filed: Sep. 1, 2004

(65) Prior Publication Data

US 2005/0033884 A1 Feb. 10, 2005

Related U.S. Application Data

(63) Continuation of application No. 10/440,079, filed on May 15, 2003, now Pat. No. 6,792,488, which is a continuation of application No. 09/475,609, filed on Dec. 30, 1999, now Pat. No. 6,584,522.

(51) Int. Cl.
  G06F 13/00 (2006.01)
  G06F 13/14 (2006.01)
  G06F 15/16 (2006.01)

(52) U.S. Cl. ............ 710/100; 710/36; 710/52; 710/107; 710/305; 709/230; 709/227; 709/232; 370/439; 700/2; 700/3; 711/118

(58) Field of Classification Search ............ 710/100, 710/107, 52, 36, 305, 310; 709/230; 370/439
See application file for complete search history.

(56) References Cited

U.S. PATENT DOCUMENTS

| 3,373,408 | A | 3/1968 | Ling |
| 3,478,322 | A | 11/1969 | Evans |
| 3,623,001 | A | 11/1971 | Kleist et al. |
| 3,736,566 | A | 5/1973 | Anderson et al. |
| 3,792,441 | A | 2/1974 | Wymore et al. |
| 3,889,243 | A | 6/1975 | Drimak |
| 3,940,745 | A | 2/1976 | Sajeva |
| 4,016,548 | A | 4/1977 | Law et al. |
| 4,032,899 | A | 6/1977 | Jenny et al. |
| 4,075,691 | A | 2/1978 | Davis et al. |
| 4,130,890 | A | 12/1978 | Adam |
| 4,400,770 | A | 8/1983 | Chan et al. |

(Continued)

FOREIGN PATENT DOCUMENTS

EP 0 379 709 8/1990

(Continued)

OTHER PUBLICATIONS

Notice of Allowability for U.S. Appl. No. 10/440,079—dated Jun. 1, 2004—3 pages—contains Reasons for Allowability.*

(Continued)

*Primary Examiner*—Mark H. Rinehart
*Assistant Examiner*—Brian Misiura
(74) *Attorney, Agent, or Firm*—Fish & Richardson P.C.

(57) ABSTRACT

A method of communicating between a first and a second processor includes the first processor sending a datum over a common control bus, and the second processor receiving the datum from the common control bus.

17 Claims, 7 Drawing Sheets

U.S. PATENT DOCUMENTS

| | | |
|---|---|---|
| 4,514,807 A | 4/1985 | Nogi |
| 4,523,272 A | 6/1985 | Fukunaga et al. .......... 710/107 |
| 4,658,351 A | 4/1987 | Teng |
| 4,709,347 A | 11/1987 | Kirk |
| 4,745,544 A | 5/1988 | Renner et al. |
| 4,788,640 A | 11/1988 | Hansen |
| 4,831,358 A | 5/1989 | Ferrio et al. |
| 4,858,108 A | 8/1989 | Ogawa et al. |
| 4,866,664 A | 9/1989 | Burkhardt et al. .......... 709/227 |
| 4,890,218 A | 12/1989 | Bram |
| 4,890,222 A | 12/1989 | Kirk |
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,251,205 A | 10/1993 | Callon et al. |
| 5,255,239 A | 10/1993 | Taborn et al. |
| 5,263,169 A | 11/1993 | Genusov et al. |
| 5,313,454 A | 5/1994 | Bustini et al. |
| 5,347,648 A | 9/1994 | Stamm et al. |
| 5,367,678 A | 11/1994 | Lee et al. |
| 5,379,295 A | 1/1995 | Yonehara |
| 5,379,432 A | 1/1995 | Orton et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,469 A | 4/1995 | Chung et al. |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,452,452 A | 9/1995 | Gaetner et al. |
| 5,459,842 A | 10/1995 | Begun et al. |
| 5,459,843 A | 10/1995 | Davis et al. |
| 5,463,625 A | 10/1995 | Yasrebi |
| 5,467,452 A | 11/1995 | Blum et al. .................... 700/2 |
| 5,475,856 A | 12/1995 | Kogge |
| 5,485,455 A | 1/1996 | Dobbins et al. |
| 5,515,296 A | 5/1996 | Agarwal |
| 5,517,648 A | 5/1996 | Bertone et al. |
| 5,539,737 A | 7/1996 | Lo et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,476 A | 10/1996 | Sherer et al. |
| 5,568,617 A | 10/1996 | Kametani ...................... 700/3 |
| 5,574,922 A | 11/1996 | James |
| 5,581,729 A | 12/1996 | Nishtala et al. |
| 5,592,622 A | 1/1997 | Isfeld et al. |
| 5,613,071 A | 3/1997 | Rankin et al. |
| 5,613,136 A | 3/1997 | Casavant et al. |
| 5,617,327 A | 4/1997 | Duncan |
| 5,623,489 A | 4/1997 | Cotton et al. |
| 5,627,829 A | 5/1997 | Gleeson et al. |
| 5,630,074 A | 5/1997 | Beltran |
| 5,630,130 A | 5/1997 | Perotto et al. |
| 5,633,865 A | 5/1997 | Short |
| 5,644,623 A | 7/1997 | Gutledge |
| 5,649,110 A | 7/1997 | Ben-Nun et al. |
| 5,649,157 A | 7/1997 | Williams |
| 5,651,002 A | 7/1997 | Van Seters et al. |
| 5,659,687 A | 8/1997 | Kim et al. |
| 5,680,641 A | 10/1997 | Sidman |
| 5,689,566 A | 11/1997 | Nguyen |
| 5,692,126 A | 11/1997 | Templeton et al. |
| 5,699,537 A | 12/1997 | Sharangpani et al. |
| 5,701,434 A | 12/1997 | Nakagawa |
| 5,717,898 A | 2/1998 | Kagan et al. |
| 5,721,870 A | 2/1998 | Matsumoto |
| 5,724,574 A | 3/1998 | Stratigos et al. |
| 5,740,402 A | 4/1998 | Bratt et al. |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,754,764 A | 5/1998 | Davis et al. |
| 5,761,507 A | 6/1998 | Govett |
| 5,761,522 A | 6/1998 | Hisanga et al. |
| 5,764,915 A | 6/1998 | Heimsoth et al. |
| 5,768,528 A | 6/1998 | Stumm |
| 5,781,551 A | 7/1998 | Born |
| 5,781,774 A * | 7/1998 | Krick ........................... 713/1 |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,805,816 A | 9/1998 | Picazo, Jr. et al. |
| 5,809,235 A | 9/1998 | Sharma et al. |
| 5,809,237 A | 9/1998 | Watts et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. ................. 703/24 |
| 5,828,881 A | 10/1998 | Wang |
| 5,828,901 A * | 10/1998 | O'Toole et al. ............... 710/22 |
| 5,832,215 A | 11/1998 | Kato et al. ................... 709/230 |
| 5,835,755 A | 11/1998 | Stellwagen, Jr. |
| 5,838,988 A | 11/1998 | Panwar et al. |
| 5,850,399 A | 12/1998 | Ganmukhi et al. |
| 5,850,530 A | 12/1998 | Chen et al. |
| 5,854,922 A | 12/1998 | Gravenstein et al. |
| 5,860,138 A | 1/1999 | Engebretsen et al. |
| 5,860,158 A | 1/1999 | Pai et al. ..................... 711/118 |
| 5,886,992 A | 3/1999 | Raatikaien et al. |
| 5,887,134 A | 3/1999 | Ebrahim |
| 5,890,208 A | 3/1999 | Kwon |
| 5,892,979 A | 4/1999 | Shiraki et al. |
| 5,898,686 A | 4/1999 | Virgile |
| 5,898,701 A | 4/1999 | Johnson |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,918,235 A | 6/1999 | Kirshenbaum et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,953,336 A | 9/1999 | Moore et al. |
| 5,958,031 A | 9/1999 | Kim ........................... 710/107 |
| 5,961,628 A | 10/1999 | Nguyen et al. ................. 712/2 |
| 5,968,169 A | 10/1999 | Pickett |
| 5,970,013 A | 10/1999 | Fischer et al. |
| 5,974,518 A | 10/1999 | Nogradi |
| 5,978,838 A | 11/1999 | Mohammed et al. |
| 5,983,274 A | 11/1999 | Hyder et al. |
| 5,995,513 A | 11/1999 | Harrand et al. |
| 6,012,151 A | 1/2000 | Mano |
| 6,014,729 A | 1/2000 | Lannan et al. |
| 6,023,742 A | 2/2000 | Ebeling et al. |
| 6,032,190 A | 2/2000 | Bremer et al. |
| 6,032,218 A | 2/2000 | Lewin et al. |

| Patent | Kind | Date | Name | Ref |
|---|---|---|---|---|
| 6,047,002 | A | 4/2000 | Hartmann et al. | |
| 6,049,867 | A | 4/2000 | Eickemeyer et al. | |
| 6,058,168 | A | 5/2000 | Braband | |
| 6,061,710 | A | 5/2000 | Eickemeyer et al. | |
| 6,067,300 | A | 5/2000 | Baumert et al. | |
| 6,067,585 | A | 5/2000 | Hoang | |
| 6,070,231 | A | 5/2000 | Ottinger | |
| 6,072,781 | A | 6/2000 | Feeney et al. | |
| 6,073,215 | A | 6/2000 | Snyder | |
| 6,079,008 | A | 6/2000 | Clery, III | |
| 6,085,215 | A | 7/2000 | Ramakrishnan et al. | |
| 6,085,248 | A * | 7/2000 | Sambamurthy et al. | 709/229 |
| 6,085,294 | A | 7/2000 | Van Doren et al. | |
| 6,092,127 | A | 7/2000 | Tausheck | |
| 6,092,158 | A | 7/2000 | Harriman et al. | |
| 6,104,700 | A | 8/2000 | Haddock et al. | |
| 6,111,886 | A | 8/2000 | Stewart | |
| 6,112,016 | A | 8/2000 | MacWilliams et al. | 709/232 |
| 6,122,251 | A | 9/2000 | Shinohara | |
| 6,128,669 | A | 10/2000 | Moriarty et al. | |
| 6,134,665 | A | 10/2000 | Klein et al. | |
| 6,141,677 | A | 10/2000 | Hanif et al. | |
| 6,141,689 | A | 10/2000 | Yasrebi | |
| 6,141,765 | A | 10/2000 | Sherman | |
| 6,144,669 | A | 11/2000 | Williams et al. | |
| 6,145,054 | A | 11/2000 | Mehrotra et al. | |
| 6,157,955 | A | 12/2000 | Narad et al. | |
| 6,160,562 | A | 12/2000 | Chin et al. | |
| 6,170,051 | B1 | 1/2001 | Dowling | |
| 6,182,177 | B1 | 1/2001 | Harriman | |
| 6,195,676 | B1 | 2/2001 | Spix et al. | |
| 6,199,133 | B1 | 3/2001 | Schnell | |
| 6,201,807 | B1 | 3/2001 | Prasanna | |
| 6,212,542 | B1 | 4/2001 | Kahle et al. | |
| 6,212,544 | B1 | 4/2001 | Borkenhagen et al. | |
| 6,212,604 | B1 | 4/2001 | Tremblay | |
| 6,212,611 | B1 | 4/2001 | Nizar et al. | |
| 6,216,220 | B1 | 4/2001 | Hwang | |
| 6,223,207 | B1 | 4/2001 | Lucovsky et al. | |
| 6,223,238 | B1 | 4/2001 | Meyer et al. | 710/107 |
| 6,223,243 | B1 | 4/2001 | Ueda et al. | |
| 6,223,274 | B1 | 4/2001 | Catthoor et al. | |
| 6,223,279 | B1 | 4/2001 | Nishimura et al. | |
| 6,247,025 | B1 | 6/2001 | Bacon | |
| 6,256,713 | B1 | 7/2001 | Audityan et al. | |
| 6,269,391 | B1 | 7/2001 | Gillespie | |
| 6,272,109 | B1 | 8/2001 | Pei et al. | |
| 6,272,520 | B1 | 8/2001 | Sharangpani et al. | |
| 6,272,616 | B1 | 8/2001 | Fernando et al. | |
| 6,275,505 | B1 | 8/2001 | O'Loughlin et al. | |
| 6,279,113 | B1 | 8/2001 | Vaidya | |
| 6,282,169 | B1 | 8/2001 | Kiremidjian | |
| 6,286,083 | B1 | 9/2001 | Chin et al. | |
| 6,289,011 | B1 | 9/2001 | Seo et al. | |
| 6,295,600 | B1 | 9/2001 | Parady | |
| 6,298,370 | B1 | 10/2001 | Tang et al. | |
| 6,307,789 | B1 | 10/2001 | Wolrich et al. | |
| 6,311,261 | B1 | 10/2001 | Chamdani et al. | |
| 6,320,861 | B1 | 11/2001 | Adam et al. | |
| 6,324,624 | B1 | 11/2001 | Wolrich et al. | |
| 6,338,078 | B1 | 1/2002 | Chang et al. | |
| 6,345,334 | B1 | 2/2002 | Nakagawa et al. | |
| 6,347,344 | B1 | 2/2002 | Baker et al. | |
| 6,349,331 | B1 * | 2/2002 | Andra et al. | 709/220 |
| 6,356,962 | B1 | 3/2002 | Kasper et al. | |
| 6,359,911 | B1 | 3/2002 | Movshovich et al. | |
| 6,360,262 | B1 | 3/2002 | Guenthner et al. | |
| 6,360,277 | B1 | 3/2002 | Ruckley et al. | |
| 6,366,998 | B1 | 4/2002 | Mohamed | |
| 6,373,848 | B1 | 4/2002 | Allison et al. | |
| 6,377,998 | B2 * | 4/2002 | Noll et al. | 709/236 |
| 6,389,031 | B1 | 5/2002 | Chao et al. | |
| 6,389,449 | B1 | 5/2002 | Nermirovsky et al. | |
| 6,393,026 | B1 | 5/2002 | Irwin | |
| 6,393,483 | B1 | 5/2002 | Latif et al. | |
| 6,404,737 | B1 | 6/2002 | Novik et al. | |
| 6,415,338 | B1 | 7/2002 | Habot | |
| 6,418,488 | B1 | 7/2002 | Chilton et al. | |
| 6,424,657 | B1 | 7/2002 | Voit et al. | |
| 6,424,659 | B2 | 7/2002 | Viswanadham et al. | |
| 6,426,940 | B1 | 7/2002 | Seo et al. | |
| 6,426,943 | B1 | 7/2002 | Spinney et al. | |
| 6,427,196 | B1 | 7/2002 | Adiletta et al. | |
| 6,430,626 | B1 | 8/2002 | Witkowski et al. | |
| 6,434,145 | B1 | 8/2002 | Opsasnick et al. | |
| 6,438,132 | B1 | 8/2002 | Vincent et al. | |
| 6,438,134 | B1 | 8/2002 | Chow et al. | |
| 6,448,812 | B1 | 9/2002 | Bacigalupo | |
| 6,453,404 | B1 | 9/2002 | Bereznyi et al. | |
| 6,457,015 | B1 | 9/2002 | Eastham | |
| 6,463,035 | B1 | 10/2002 | Moore | |
| 6,463,072 | B1 * | 10/2002 | Wolrich et al. | 370/439 |
| 6,463,480 | B2 | 10/2002 | Kikuchi et al. | |
| 6,463,527 | B1 | 10/2002 | Vishkin | |
| 6,466,898 | B1 | 10/2002 | Chan | |
| 6,477,562 | B2 | 11/2002 | Nemirovsky et al. | |
| 6,484,224 | B1 | 11/2002 | Robins et al. | |
| 6,501,731 | B1 | 12/2002 | Bleszynski et al. | |
| 6,507,862 | B1 | 1/2003 | Joy et al. | |
| 6,522,188 | B1 | 2/2003 | Poole | |
| 6,526,451 | B2 | 2/2003 | Kasper | |
| 6,526,452 | B1 * | 2/2003 | Petersen et al. | 709/251 |
| 6,529,983 | B1 | 3/2003 | Marshall et al. | |
| 6,532,509 | B1 | 3/2003 | Wolrich et al. | |
| 6,535,878 | B1 | 3/2003 | Guedalia et al. | |
| 6,552,826 | B2 | 4/2003 | Adler et al. | |
| 6,553,406 | B1 | 4/2003 | Berger et al. | |
| 6,560,667 | B1 | 5/2003 | Wolrich et al. | |
| 6,570,850 | B1 | 5/2003 | Gutierrez et al. | |
| 6,577,542 | B2 | 6/2003 | Wolrich et al. | |
| 6,584,522 | B1 * | 6/2003 | Wolrich et al. | 710/100 |
| 6,587,906 | B2 | 7/2003 | Wolrich et al. | |
| 6,604,125 | B1 | 8/2003 | Belkin | |
| 6,606,704 | B1 | 8/2003 | Adiletta et al. | |
| 6,625,654 | B1 | 9/2003 | Wolrich et al. | |
| 6,628,668 | B1 | 9/2003 | Hutzli et al. | |
| 6,629,147 | B1 | 9/2003 | Grow | |
| 6,629,236 | B1 | 9/2003 | Aippersbach et al. | |
| 6,631,422 | B1 | 10/2003 | Althaus et al. | |
| 6,631,430 | B1 | 10/2003 | Wolrich et al. | |
| 6,631,462 | B1 | 10/2003 | Wolrich et al. | |
| 6,657,963 | B1 | 12/2003 | Paquette et al. | |
| 6,658,551 | B1 | 12/2003 | Berenbaum et al. | |
| 6,661,774 | B1 | 12/2003 | Lauffenburger et al. | |
| 6,661,794 | B1 | 12/2003 | Wolrich et al. | |
| 6,665,699 | B1 | 12/2003 | Hunter et al. | |
| 6,665,755 | B2 | 12/2003 | Modelski et al. | |
| 6,667,920 | B2 | 12/2003 | Wolrich et al. | |
| 6,668,317 | B1 | 12/2003 | Bernstein et al. | |
| 6,671,827 | B2 | 12/2003 | Guilford et al. | |
| 6,675,190 | B1 | 1/2004 | Schabernack et al. | |
| 6,675,192 | B2 | 1/2004 | Emer et al. | |
| 6,678,746 | B1 | 1/2004 | Russell et al. | |
| 6,680,933 | B1 | 1/2004 | Cheesman et al. | |
| 6,681,300 | B2 | 1/2004 | Wolrich et al. | |
| 6,684,326 | B1 * | 1/2004 | Cromer et al. | 713/2 |
| 6,694,380 | B1 | 2/2004 | Wolrich et al. | |
| 6,697,379 | B1 | 2/2004 | Jacquet et al. | |
| 6,721,325 | B1 | 4/2004 | Duckering et al. | |
| 6,724,767 | B1 | 4/2004 | Chong et al. | |
| 6,728,845 | B2 | 4/2004 | Adiletta | |
| 6,732,187 | B1 | 5/2004 | Lougheed et al. | |
| 6,754,211 | B1 | 6/2004 | Brown | |
| 6,754,222 | B1 | 6/2004 | Joung et al. | |
| 6,768,717 | B1 | 7/2004 | Reynolds et al. | |
| 6,775,284 | B1 | 8/2004 | Calvignac et al. | |

| | | | |
|---|---|---|---|
| 6,792,488 B2* | 9/2004 | Wolrich et al. ............. 710/100 |
| 6,798,744 B1 | 9/2004 | Bradshaw et al. |
| 6,826,615 B2 | 11/2004 | Barrall et al. |
| 6,834,053 B1 | 12/2004 | Stacey et al. |
| 6,850,521 B1 | 2/2005 | Kadambi et al. |
| 6,856,622 B1 | 2/2005 | Calamvokis et al. |
| 6,873,618 B1 | 3/2005 | Weaver |
| 6,876,561 B2 | 4/2005 | Adiletta et al. |
| 6,895,457 B2 | 5/2005 | Wolrich et al. |
| 6,925,637 B2 | 8/2005 | Thomas et al. |
| 6,931,641 B1 | 8/2005 | Davis et al. |
| 6,934,780 B2 | 8/2005 | Modelski et al. |
| 6,934,951 B2 | 8/2005 | Wilkinson et al. |
| 6,938,147 B1 | 8/2005 | Joy et al. |
| 6,944,850 B2 | 9/2005 | Hooper et al. |
| 6,947,425 B1 | 9/2005 | Hooper et al. |
| 6,952,824 B1 | 10/2005 | Hooper et al. |
| 6,959,002 B2 | 10/2005 | Wynne et al. |
| 6,967,963 B1 | 11/2005 | Houh et al. |
| 6,976,095 B1 | 12/2005 | Wolrich et al. |
| 6,981,077 B2 | 12/2005 | Modelski et al. |
| 6,983,350 B1 | 1/2006 | Wheeler et al. |
| 7,006,495 B2 | 2/2006 | Hooper |
| 7,065,569 B2 | 6/2006 | Teraslinna |
| 7,069,548 B2 | 6/2006 | Kushlis |
| 7,096,277 B2 | 8/2006 | Hooper |
| 7,100,102 B2 | 8/2006 | Hooper et al. |
| 7,111,072 B1 | 9/2006 | Matthews et al. |
| 7,111,296 B2 | 9/2006 | Wolrich et al. |
| 7,124,196 B2 | 10/2006 | Hooper |
| 7,126,952 B2 | 10/2006 | Hooper et al. |
| 7,149,786 B1* | 12/2006 | Bohringer et al. .......... 709/208 |
| 7,181,742 B2 | 2/2007 | Hooper |
| 7,191,321 B2 | 3/2007 | Bernstein et al. |
| 7,206,858 B2 | 4/2007 | Hooper et al. |
| 7,248,584 B2 | 7/2007 | Hooper |
| 2001/0023487 A1 | 9/2001 | Kawamoto |
| 2002/0027448 A1 | 3/2002 | Bacigalupo |
| 2002/0041520 A1 | 4/2002 | Wolrich et al. |
| 2002/0075878 A1 | 6/2002 | Lee et al. |
| 2002/0118692 A1 | 8/2002 | Oberman et al. |
| 2002/0150047 A1 | 10/2002 | Knight et al. |
| 2002/0181194 A1 | 12/2002 | Ho et al. |
| 2003/0043803 A1 | 3/2003 | Hooper |
| 2003/0067934 A1 | 4/2003 | Hooper et al. |
| 2003/0086434 A1 | 5/2003 | Kloth |
| 2003/0105901 A1 | 6/2003 | Wolrich et al. |
| 2003/0105917 A1 | 6/2003 | Ostler et al. |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. |
| 2003/0131198 A1 | 7/2003 | Wolrich et al. |
| 2003/0140196 A1 | 7/2003 | Wolrich et al. |
| 2003/0145159 A1 | 7/2003 | Adiletta et al. |
| 2003/0147409 A1 | 8/2003 | Wolrich et al. |
| 2003/0161303 A1 | 8/2003 | Mehrvar et al. |
| 2003/0161337 A1 | 8/2003 | Weinman |
| 2003/0210574 A1 | 11/2003 | Wolrich et al. |
| 2003/0231635 A1 | 12/2003 | Kalkunte et al. |
| 2004/0039895 A1 | 2/2004 | Wolrich et al. |
| 2004/0052269 A1 | 3/2004 | Hooper et al. |
| 2004/0054880 A1 | 3/2004 | Bernstein et al. |
| 2004/0059828 A1 | 3/2004 | Hooper et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0085901 A1 | 5/2004 | Hooper et al. |
| 2004/0098496 A1 | 5/2004 | Wolrich et al. |
| 2004/0109369 A1 | 6/2004 | Wolrich et al. |
| 2004/0148382 A1 | 7/2004 | Narad et al. |
| 2004/0162933 A1 | 8/2004 | Adiletta et al. |
| 2004/0252686 A1 | 12/2004 | Hooper et al. |
| 2005/0033884 A1* | 2/2005 | Wolrich et al. ............. 710/100 |
| 2005/0149665 A1 | 7/2005 | Wolrich et al. |
| 2006/0007871 A1 | 1/2006 | Welin |
| 2006/0069882 A1 | 3/2006 | Wheeler et al. |
| 2006/0156303 A1 | 7/2006 | Hooper et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 773 648 | 5/1997 |
| EP | 0 809 180 | 11/1997 |
| EP | 0 959 602 | 11/1999 |
| JP | 59111533 | 6/1984 |
| WO | WO 94/15287 | 7/1994 |
| WO | WO 97/38372 | 10/1997 |
| WO | WO 98/20647 | 5/1998 |
| WO | WO 00/38376 | 6/2000 |
| WO | WO 00/56024 | 9/2000 |
| WO | WO 01/15718 | 3/2001 |
| WO | WO 01/16718 | 3/2001 |
| WO | WO 01/16769 | 3/2001 |
| WO | WO 01/16770 | 3/2001 |
| WO | WO 01/16782 | 3/2001 |
| WO | WO 01/17179 | 3/2001 |
| WO | WO 01/31856 | 5/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO03/030461 | 4/2003 |

OTHER PUBLICATIONS

"Media Access Control"—retrieved from http://en.wikipedia.org/wiki/Media_Access_Control on Jul. 31, 2007—2 pages.*
"Quality-of-Service-Oriented Media Acess Control for Advanced Mobile Multimedia Satellite Systems"—retrieved from http://ieeexplore.ieee.org/iel5/8360/26341/01174866.pdf?tp=&arnumber=1174866&isnumber=26341 on Jul. 31, 2007—8 pages.*
"An Efficient Media Access Control Protocol for Broadband Wireless Access Systems"—retrieved from http://grouper.ieee.org/groups/802//16/tg1/mac/contrib/80216mc-99_10.pdf on Jul. 31, 2007—19 pages.*
"Improving Performance of Adaptive Media Access Control Protocols for High-density Wireless Networks"—retrieved from http://ieeexplore.ieee.org/iel5/6313/16882/00778958.pdf?tp=&arnumber=778958&isnumber=16882 on Jul. 31, 2007—6 pages.*
"A comparison of fibre channel and 802 MAC services"—abstract only—1 page—Local Computer Networks, 1993., Proceedings., 18$^{th}$ Conference on Local Computer Networks.*
"Nomadic Threads: A migrating multithread approach to remote memory accesses in multiprocessors", by Jenks, S.; Gaudiot, J.L. (abstract only) Publication Date: Oct. 20-23, 1996.
"Overview of the START (*T) multithreaded computer" by Beckeerie, M.J. (abstract only) Publication Date: Feb. 22-26, 1993.
U.S. Appl. No. 10/726,757, filed Dec. 3, 2003, Wolrich et al.
U.S. Appl. No. 10/684,078, filed Oct. 10, 2003, Wolrich et al.
U.S. Appl. No. 10/664,202, filed Sep. 16, 2003, Wolrich et al.
U.S. Appl. No. 10/644,337, filed Aug. 20, 2003, Wolrich et al.
U.S. Appl. No. 10/643,438, filed Aug. 19, 2003, Bernstein et al.
U.S. Appl. No. 10/615,500, filed Jul. 8, 2003, Adiletta.
U.S. Appl. No. 10/615,280, filed Jul. 8, 2003, Wolrich et al.
U.S. Appl. No. 10/208,264, filed Jul. 30, 2002, Adiletta et al.
U.S. Appl. No. 09/476,303, filed Dec. 30, 1999, Wolrich et al.
U.S. Appl. No. 09/475,614, filed Dec. 30, 1999, Wolrich et al.
U.S. Appl. No. 09/473,571, filed Dec. 28, 1999, Wolrich et al.
U.S. Appl. No. 09/387,109, filed Aug. 31, 1999, Adiletta et al.
Byrd et al., "Multithread Processor Architectures," *IEEE Spectrum*, vol. 32, No. 8, New York, Aug. 1, 1995, pp. 38-46.
Doyle et al., *Microsoft Press Computer Dicitionary*, 2$^{nd}$ ed., Microsoct Press, Redmond, Washington, USA, 1994, p. 326.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5th Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al., "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

"10-/100-Mbps Ethernet Media Access Controller (MAC) Core", NEC, 1998, pp. 1-5.

"Enterprise Hardware, Intel Expected to Unveil New Networking Chip," News.Com, Aug. 26, 1999, <http://new.com.com/Intel+expected+to+unveil+new+networking+chip/2100-1001_3-230315.html> (accessed on Aug. 23, 2005), pp. 1-5.

"The ATM Forum Technical Committee Traffic Management Specification Version 4.1", The ATM Forum (Mar. 1999).

Agarwal et al., "April: A Processor Architecture for Multiprocessing," Proceedings of the 17th Annual International Symposium on Computer Architecutre, *IEEE*, pp. 104-114, (1990).

Chandranmenon, G.P., et al., "Trading Packet Headers for Packet Processing", *IEEE/ACM Transactions on Networking*, 4(2):141-152, Apr. 1996.

Chappell, et al., "Simultaneous Subordinate Microthreading (SSMT)", *IEEE*, pg. 186-195 (1999).

*Dictionary of Computer Words: An A to Z Guide to Today's Computers, Revised Edition*, Houghton Mifflin Company: Boston, Massachusetts, pp. 220, (1995).

*Digital Semiconductor 21140A PCI Fast Ethernet LAN Controller, Hardware Reference Manual*, Digital Equipment Corporation, pp. i-x, 1-1 through 1-5, 2-1 throught 2-12, 3-1 through 3-38, 4-31 through 5-2, 6-1 through 6-24, (Mar. 1998).

Farrens, et al., "Strategies for Achieving Improved Processor Throughput", *ACM*, p. 362-369 (1991).

Frazier, Howard, "Gigabit Ethernet: From 100 to 1,000 Mbps", *IEEE Internet Computing*, pp. 24-31, (1999).

Frazier, Howard, "The 802.3z Gigabit Ethernet Standard", *IEEE Network*, pp. 6-7, (1998).

Giroux, N., et al., "Queuing and Scheduling: Quality of Service in ATM Networks, Chapter 5", *Quality of Service in ATM Networks: State-of-the-Art Traffic Management*, pp. 96-121 (1998).

Govind, et al., "Performance modeling and architecture exploration of network processors", *Quantitative Evaluation of Systems*, abstract only (1 page), Sep. 2005.

Ippoliti, A., et al., "Parallel Media Access Controller for Packet Communications at Gb/s Rates", *IEEE*, pp. 991-996, (1990).

Kaiserswerth, M., "The Parallel Protocol Engine", *IEEE/ACM Transactions on Networking*, 1(6):650-663, Dec. 1993.

Khailany, B., et al., "Imagine: Media Processing with Streams," IEEE Micro, Mar. -Apr. 2001, pp. 35-46.

Leon-Garcia, A., *Communication Networks: Fundamental Concepts and Key Architectures*, McGraw-Hill Higher Education, Copyright 2000, pp. 195-198, 215-219, & 380-385.

Shaw, M.C., et al., *UNIX Internals: A Systems Operations Handbook*, Windcrest Books, pp. 30-37, 1987.

Vuppala, V., et al., "Layer-3 switching using virtual network ports", *IEEE Proc. Computer Communications and Networks*, pp. 642-648, 1999.

* cited by examiner

US 7,328,289 B2

COMMUNICATION BETWEEN PROCESSORS

PRIORITY CLAIM UNDER 35 U.S.C. §120

This application is a continuation of application Ser. No. 10/440,079, filed on May 15, 2003, (Now U.S. Pat. No. 6,792,488), which was a continuation of application Ser. No. 09/475,609, filed on Dec. 30, 1999 (Now U.S. Pat. No. 6,584,522).

BACKGROUND

The invention relates to communication between processors.

Multi-processor computer systems have more than one processor. Each processor executes a separate stream ("thread") of instructions. It is sometimes necessary for two processors of a computer system to communicate data between themselves.

SUMMARY

In one general aspect of the invention, a method of communicating between a first and a second processor includes the first processor sending a datum over a common control bus, and the second processor receiving the datum from the common control bus.

Advantages and other features of the invention will become apparent from the following description and from the claims.

DETAILED DESCRIPTION

Figure 1:
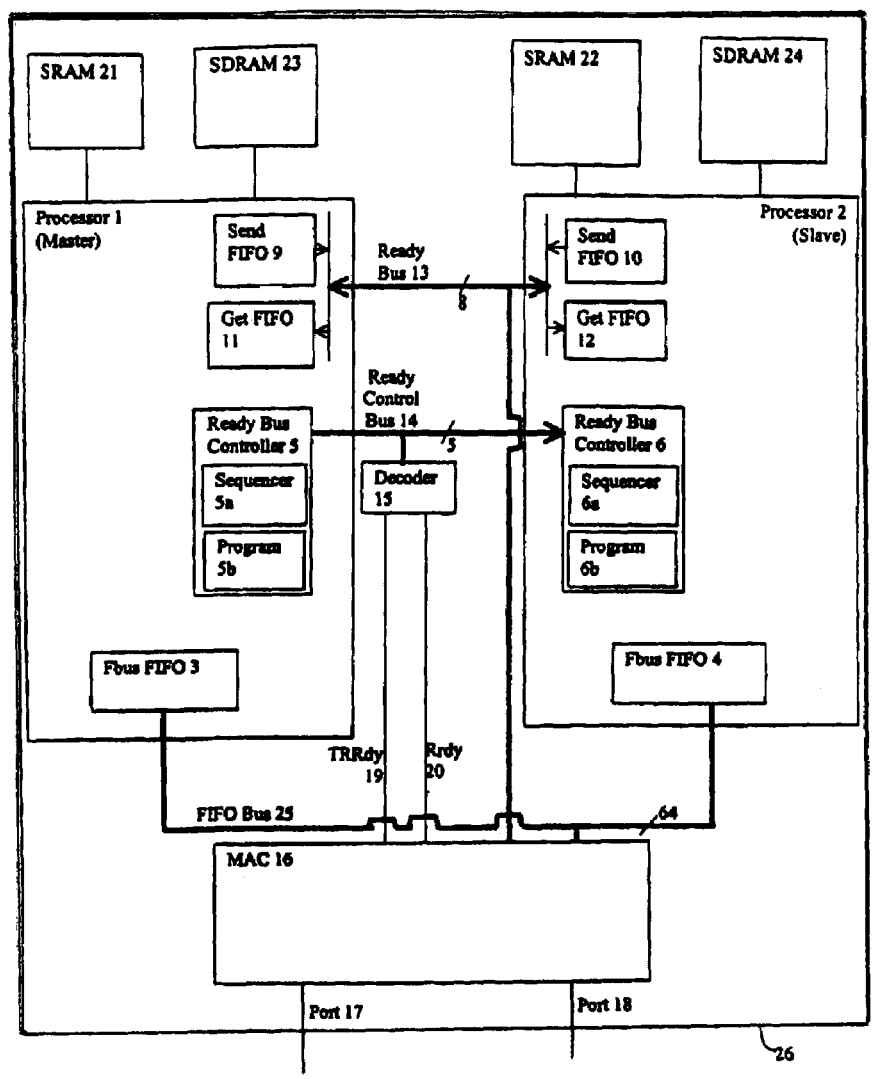
FIG. 1 shows a computer system that has a first and a second processor.

Referring to FIG. 1, a computer system 26 includes two processors 1, 2. Each processor 1, 2 has a corresponding static random access memory (SRAM) 21, 22 for storing data that needs to be accessed with a low latency and a corresponding synchronous dynamic random access memory (SDRAM) 23, 24 for processing large volumes of data.

The processors 1,2 each have an Fbus FIFO 3, 4, which is connected to a 64-bit FIFO bus 25, for communicating to peripheral devices, such as media access controller (MAC) 16. MAC 16 may be a Gigabit Ethernet device that complies with the IEEE 802.3z standard. MAC 16 has two data ports 17, 18. Multiple peripheral devices may be concurrently connected to the FIFO bus 25. Through the FIFO bus 25, each of the processors 1, 2 can communicate with any peripherals 16 connected to the FIFO bus.

At any time, one processor ("the master") controls the FIFO bus 25 using signals sent over the Ready Control Bus 14, while the other processor ("the slave") responds to instructions from the master. In FIG. 1, processor 1 is the master while processor 2 is the slave.

The master controls communications on the first-in-first-out-buffer (FIFO) bus using signals sent on a 5-bit Ready Control Bus 14. The signals allow the master to directly address a device or a slave processor on the bus and to send a query to determine whether the device is ready to transmit (TRRdy) or receive (RRdy) data on the bus. The computer system may include a decoder 15 for decoding signals from the Ready Control Bus into a single TRRdy signal 19 and a single Rrdy signal 20 for a device 16 on the bus.

Additionally, the computer system includes an 8-bit Ready Bus 13, which is used by the master processor 1 to control data flow on the devices on the FIFO bus 25. For example, master processor 1 may use the Ready Bus 13 to direct MAC 16 to send data from port 1 instead of sending data from port 2 onto the bus. Each processor 1, 2 has a send FIFO 9, 10 for buffering data elements that are to be sent on the Ready Bus 13, and a get FIFO 11, 12 for buffering data elements that are received from the Ready Bus 13. Each FIFO 9-12 is capable of storing a number of data elements, and each data element may be a byte, a word, a long word, or a quad word. In the example of FIG. 1, the FIFOs 9-12 are configured to store up to eight long words, each of which has 32 bits. Because each data element is 32 bits, it takes four data transfers on the ready bus to transmit a data element from one processor to other. Other implementations with different bus width and data element sizes may take a different number of transfers to transmit a data element.

Each processor 1, 2 has a Ready Bus controller 5, 6 for controlling the Ready Control Bus 14, the Ready Bus 13 and the FIFO bus 25. The Ready Bus controller 5, 6 may be a microcode program, logic, or a processing unit within the processor. In the embodiment of FIG. 1, the Ready Bus Controller 5, 6 includes a sequencer 5a, 6a for executing a sequence of bus control instructions. The bus control instructions are part of a program 5b, 6b.

The system 26 provides a way of communicating between processors 1, and 2 over the Ready Bus 13, when the Ready Bus is not being used to communicate data to peripheral devices. Referring to FIG. 2A, processor 1 executes a sequence of instructions contained within program 5b. The instructions include a "GET 6" instruction 32a, which directs the processor 1 to retrieve six data elements from processor 2 and a "PUT 3" instruction, which directs processor 1 to send three data elements to processor 2.

Figure 2B:
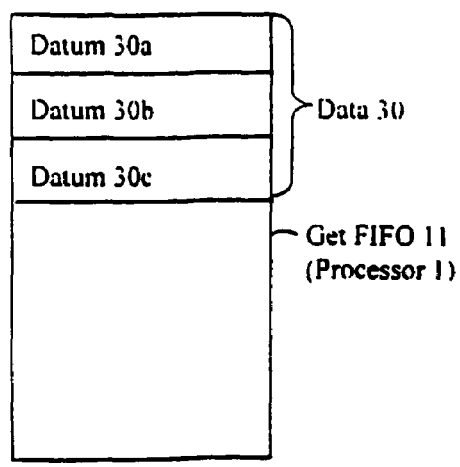
FIG. 2B shows a get FIFO of the first processor of FIG. 1.
Figure 2C:
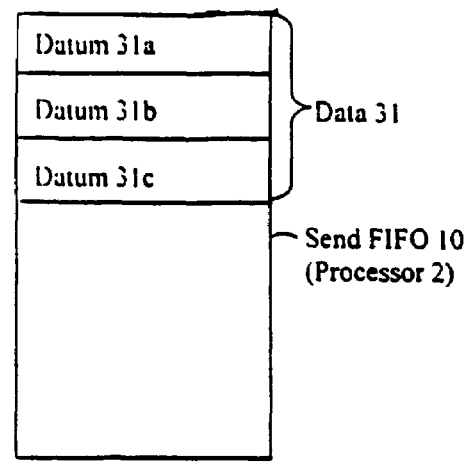
FIG. 2C shows a send FIFO of the second processor of FIG. 1.
Figure 2A:
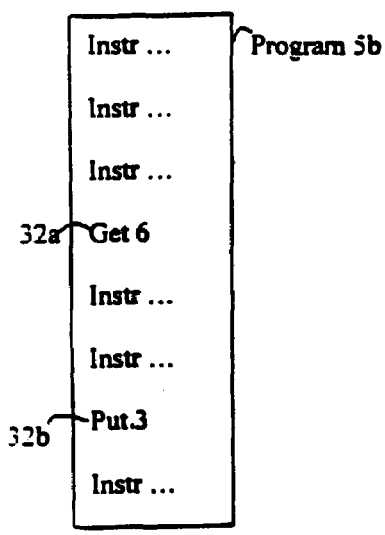
FIG. 2A shows a program executed by the first processor of FIG. 1 that includes a GET instruction and a PUT instruction.

Referring to FIGS. 2B and 2C, the state, of the get FIFO 11 of processor 1 and the send FIFO 10 of processor 2 prior to the execution of the GET instruction 32a (FIG. 2A) will be described. As shown, get FIFO 11 contains three data elements 30a-c that were previously retrieved from processor 2. However, the number of data elements is less than the six data elements required by the GET instruction 32a. Send FIFO 10 of processor 2 contains 3 data elements 31a-c that are to be sent to processor 1. The data 31 in the send FIFO 10 is transferred to the get FIFO 11 by the GET instruction 32a as described below.

Figure 3:
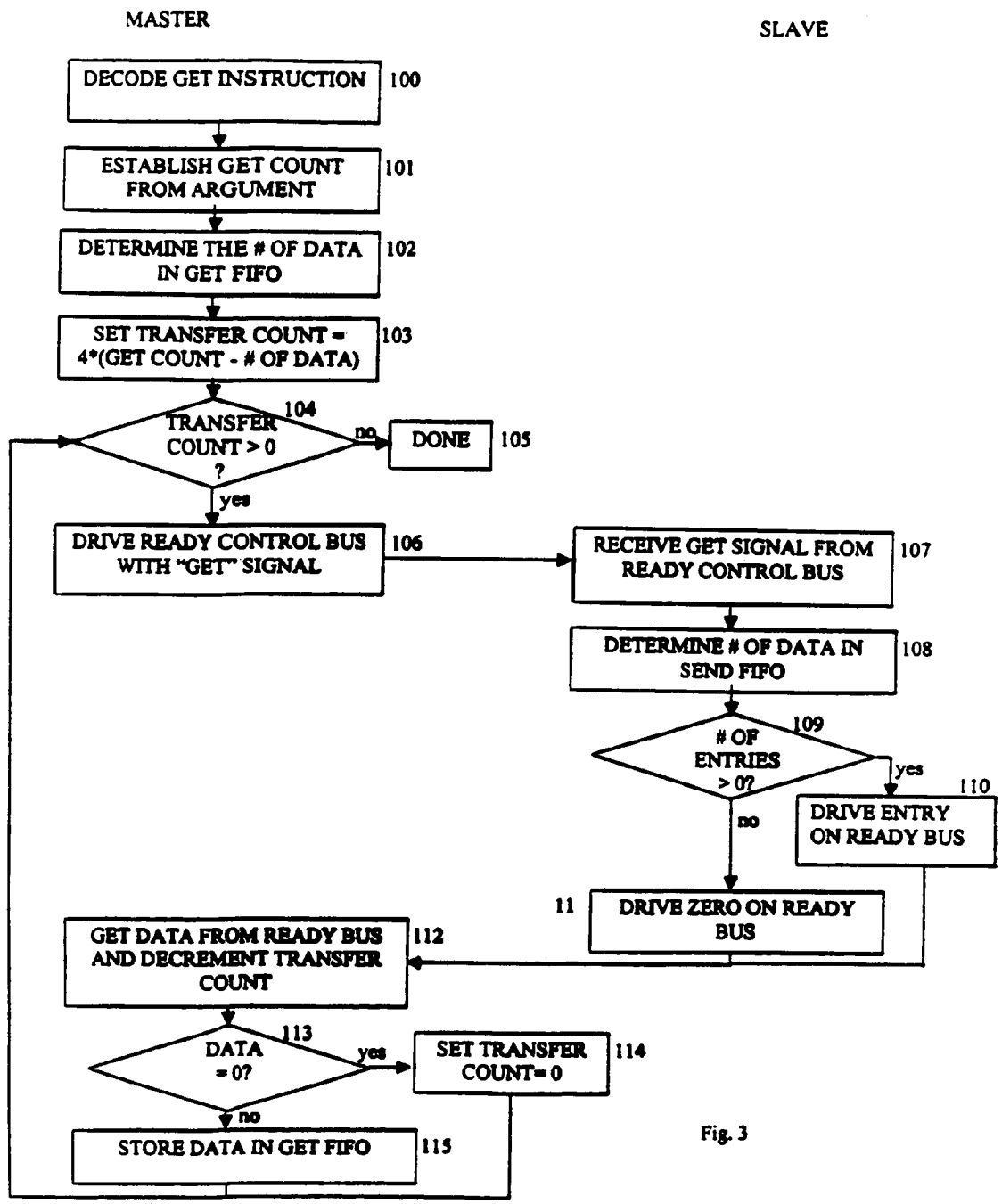
FIG. 3 is a flow chart of the execution of the GET instruction of FIG. 2A.

Referring to FIG. 3, communication of data from a slave processor 2 to the master processor 1 over the Ready Bus 13 will be described. Upon decoding 100 a GET instruction, such as instruction 32a of FIG. 2A, processor 1 determines 101 the number of data elements to be retrieved based on an argument to the GET instruction. For instruction 32a, the number of items to be retrieved is six. The processor 1 determines 102 the number of data elements that are already in its get FIFO 1. The number of data elements in the get FIFO 11 of FIG. 2B is three. The processor 1 sets 103 the count of the number of transfers required (transfer count) to four times the difference between the number of data elements to be retrieved and the number of data elements in the get FIFO 11. The number is multiplied by four because the transmission of each 32-bit data element requires four transfers on the 8-bit ready bus. For instruction 32a and the FIFO of FIG. 2B, the number transfer count is twelve, i.e. 4*(6−3). The processor 1 checks 104 whether the transfer count is greater than zero. If it is not then the transfer of data is complete 105. Otherwise if it is, the processor 1 drives 106 the Ready Control Bus 14 with a signal (GET signal) that represents a command to get data.

Upon receiving 107 the GET signal, the slave processor 2 determines 108 the number of data elements in its send FIFO 10. The number of data elements in the send FIFO of FIG. 2C is 3. If the number of entries is greater than zero, processor 2 drives 110 the Ready Bus 13 with a signal representing the first entry in its send FIFO and removes the entry from the send FIFO. For the send FIFO of FIG. 2C, the first entry is datum 31a. Otherwise if the number of entries is zero, processor 2 drives 111 the Ready Bus 13 with a predetermined signal, such as a signal representing zero, that signifies an empty send FIFO.

Processor 1 gets 112 a signal representing data from the Ready Bus 13 and decrements the transfer count, to reflect the receipt of a datum. Processor 1 checks 113 whether the received datum is zero, which signifies an empty send FIFO.

If the received datum is zero, processor 1 sets 104 the transfer count to zero to terminate the transfer of data and proceeds to 104. In instances where each data element is transmitted in multiple transfers because the bus is narrower than the data element (as shown in FIG. 1), it is possible that only part of the required transfers associated with a data element may be completed. For example, in the system of FIGS. 1-2c, the number of transfers may not be a multiple of four, signifying that an incomplete data element has been received. Should that happen, the received data corresponding to the incomplete datum is discarded so that the received data that is processed is a multiple of four.

Otherwise if the received datum is not zero, the processor stores 115 the received datum in the get FIFO 11 of processor 1 and proceeds to 104. This process is repeated until the number of data elements in the receive FIFO 11 is equal to the argument of the GET command.

Figure 4A:
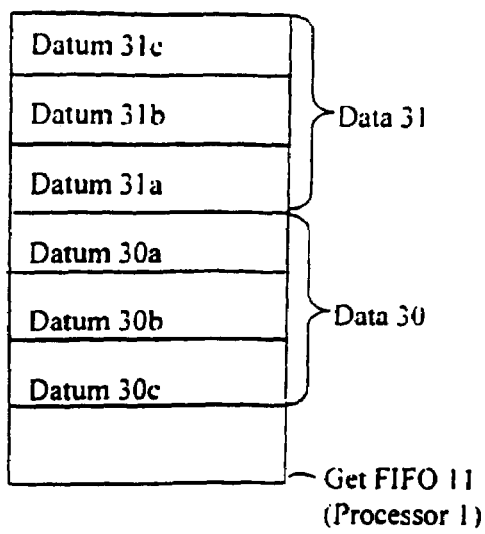
FIG. 4A shows the get FIFO of FIG. 2B after the execution of the GET instruction of FIG. 3.
Figure 4B:
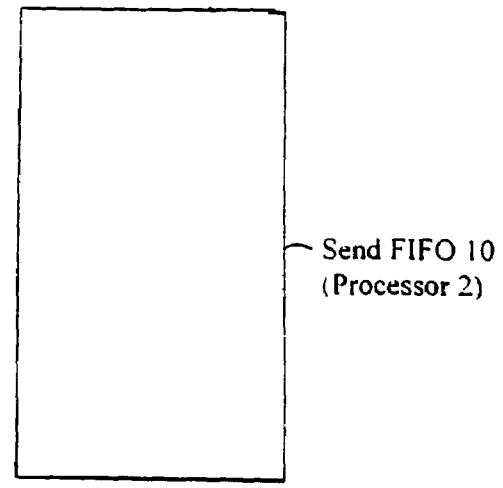
FIG. 4B shows the send FIFO of FIG. 2C after the execution of the GET instruction of FIG. 3.

Referring to FIGS. 4A and 4B, the effects of the process of FIG. 3 on the get FIFO 11 and the send FIFO 10 of FIGS. 2B and 2C will be described. The process has transferred data 31 from send FIFO 10 to get FIFO 11. Get FIFO 11 now has six data elements, as specified in the GET instruction 32a (FIG. 2A). Thus, the GET instruction provides a way to communicate data from a slave processor to a master processor using bus signals that are also used to control communication between peripherals.

Figure 5A:
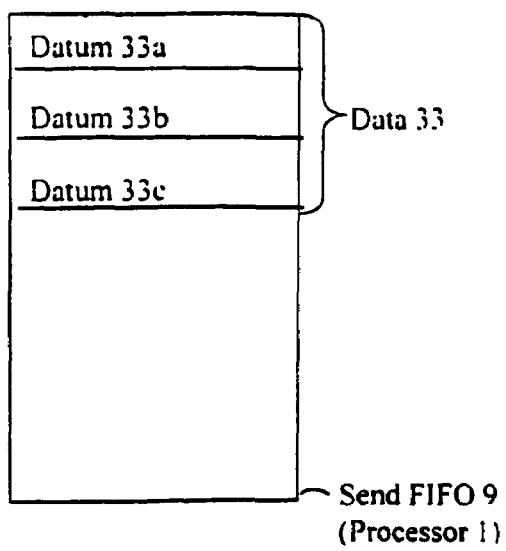
FIG. 5A shows a send FIFO of the first processor of FIG. 1 prior to the PUT instruction of FIG. 2A.
Figure 5B:
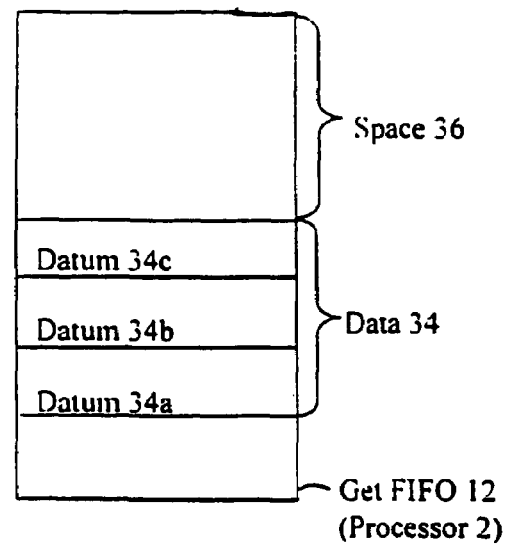
FIG. 5B shows a get FIFO of the second processor of FIG. 1 prior to the PUT instruction of FIG. 2A.

Referring to FIGS. 5A and 5B, the state of the send FIFO 9 of processor 1 and the get FIFO 12 of processor 2 prior to the PUT instruction 32b (FIG. 2A) will be described. The send FIFO 9 has three data elements 33a-c. The get FIFO 12 has three data elements 34a-c. The get FIFO 12 also has space 36 for accommodating additional data. The PUT instruction 32b transfers data from the send FIFO 9 to the get FIFO 12 as described below.

Figure 6:
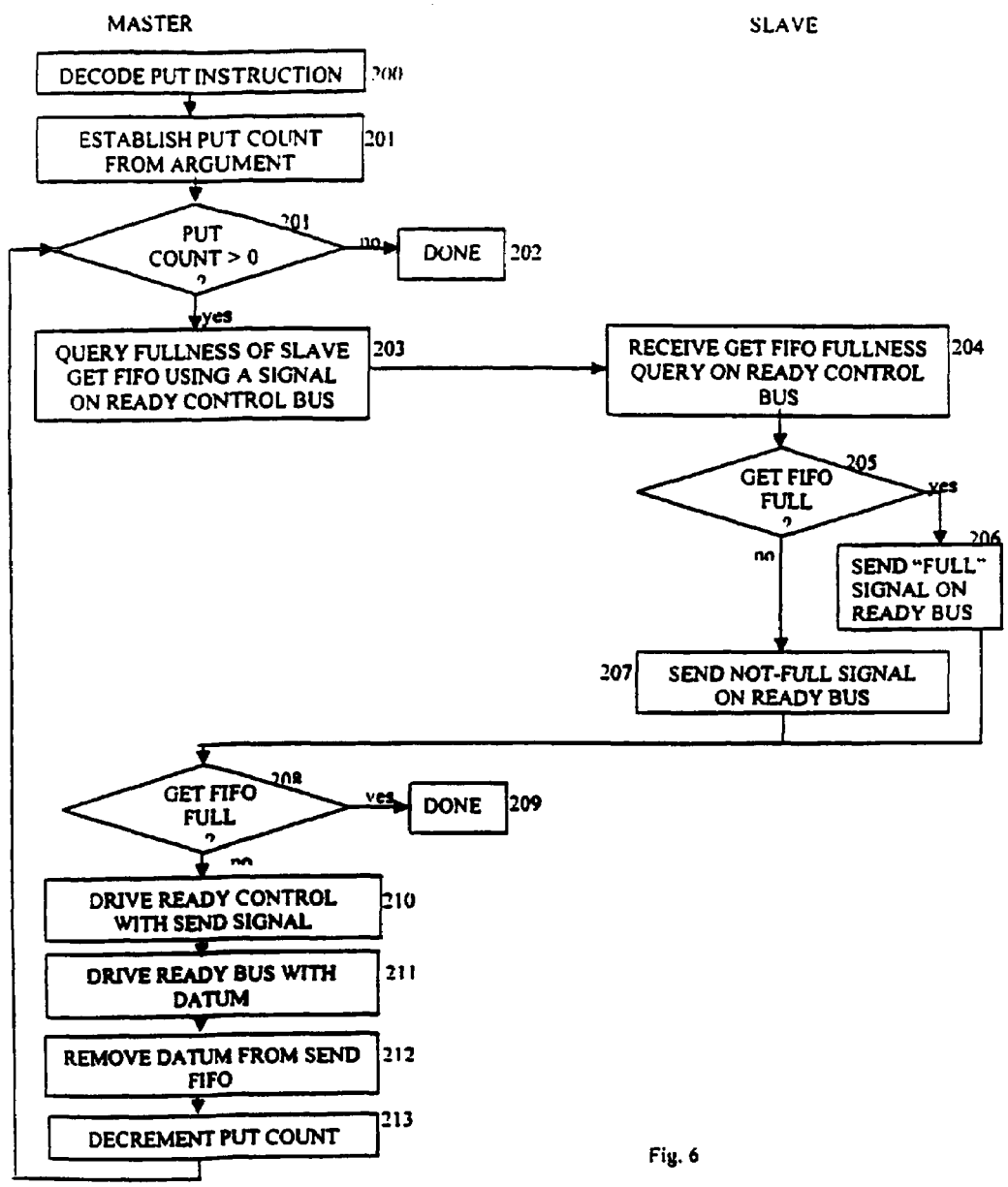
FIG. 6 is a flow chart of the execution of the PUT instruction of FIG. 2A.

Referring to FIG. 6, upon decoding 200 a PUT instruction, the master processor 1 establishes 201 the number of items (put count) to be sent to the slave processor based on the argument of the PUT instruction. Where each data element is transmitted in multiple transfers, the put count is computed by multiplying the argument with the number of transfers required to transmit a data element. For the PUT instruction 32b (FIG. 2A), the put count is 12, i.e. 3*4. The processor 2 checks 201 whether the put count is greater than zero. If the put count is not greater than zero, the process is done 202 because there are no more data elements to send. Otherwise if the put count is greater than zero, processor 1 sends 203 a signal to processor 2 over the Ready Control Bus 14 querying processor 2 to determine whether the get FIFO 12 of processor 2 is full.

Upon receiving 204 the query from processor 1, processor 2 checks 205 whether its get FIFO 12 is full. If the get FIFO 12 is full, processor 2 sends a FULL signal over the Ready Bus 13 to indicate to processor 1 that it is not ready to receive any additional data. Otherwise, processor 2 sends a NOTFULL signal over the Ready Bus to processor 1 to indicate that the get FIFO 12 is not full.

Upon receiving a signal from processor 2, processor 1 checks the signal to determine whether the get FIFO 12 of processor 2 is full. If the get FIFO 12 is full, the process is done 209 and the process terminates. Otherwise if the get FIFO 12 is not full, processor 1 drives 210 the Ready Control Bus 14 with a SEND signal to alert processor 2 that processor 1 is about to send data to processor 2. Processor 1 drives 212 the Ready Bus 13 with a datum that processor 2 stores in its get FIFO 12. Processor 1 removes 212 the sent datum from the send FIFO 9 and decrements 213 the put count, to reflect the sending of the datum. Processor 1 proceeds to 201 and repeats the process until the number of data elements sent is equal to the argument of the put instruction.

Figure 7A:
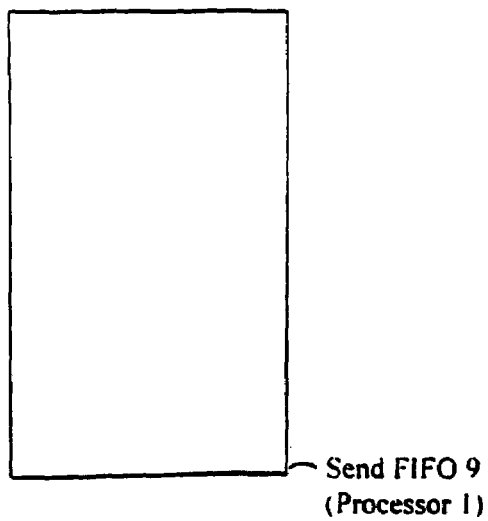
FIG. 7A shows the send FIFO of FIG. 5A after the execution of the put instruction of FIG. 6.
Figure 7B:
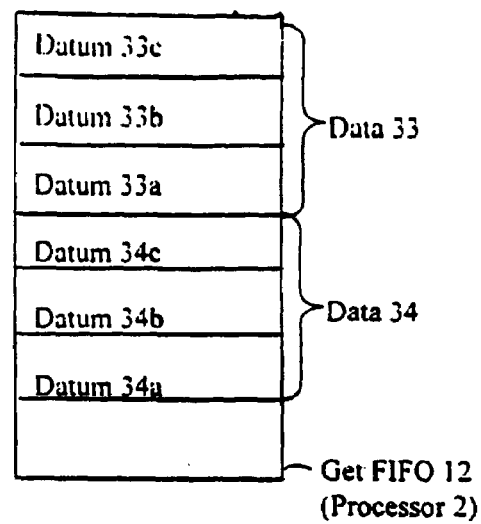
FIG. 7B shows the get FIFO of FIG. 5B after the execution of the put instruction of FIG. 6.

Referring to FIGS. 7A and 7B, the state of the send FIFO 9 (FIG. 5A) of processor 1 and the get FIFO 12 (FIG. 5B) of processor 2 after the process of FIG. 6 will be described. As shown, three data elements 33a-c have been transferred from the send FIFO 9 of processor 1 to the get FIFO 12 of processor 2 in response to the instruction 32b (FIG. 2A). Thus, the put instruction provides a method of transferring data from one processor to another processor using bus signals that are also used to control communication between peripheral devices.

Other embodiments are within the scope of the following claims. For example, alternative implementations may control data flow using the Ready Control Bus 14 signals, instead of using a separate Ready Bus 13. In these embodiments, the data communicated between the FIFOs would be sent over the Ready Control Bus, instead of the Ready Bus.

The communication method could also be used between process that share the same SRAM or SDRAM memory, instead of the separate memories shown in FIG. 1. A different kind of memory buffer could be used instead of the send or receive FIFO. For example, a LIFO may be used for the communications on the Ready Bus.

Commonly known methods may be used to transfer control from processor 1 to processor 2 so that either processor 1 or 2 can become the master as needed.

What is claimed is:

1. A method, comprising:
   receiving, at a first processor over a first bus, data from a media access controller;
   sending signals from the first processor over a second bus to the media access controller to control operation of the media access controller, the second bus being a different bus than the first bus; and
   sending data from the first processor to a second processor over the second bus.

2. The method of claim 1, further comprising receiving, at the second processor, data from the media access controller over the first bus.

3. The method of claim 1 wherein the sending data from the first processor to the second processor over the second bus comprises sending data in response to a put operation initiated by the first processor.

4. The method of claim 3 wherein the put operation identifies a number of elements to send; and the method further comprises:
   transferring fewer than the identified number of elements.

5. The method of claim 1, further comprising, receiving at the first processor over a third bus, a signal from the second processor identifying a buffer of the second processor used to store data sent by the first processor as full, the third bus being a different bus than the first or second buses.

6. The method of claim 1 wherein the sending data from the first processor to the second processor comprises sending data in response to a get operation initiated by the second processor.

7. The method of claim 6 wherein the get operation identifies a number of elements to receive; and the method further comprises:
   sending fewer than the identified number of elements if a buffer of the first processor does not at least the identified number of units.

8. The method of claim 1 further comprising:
   sending from the first processor to the second processor over a third bus a signal indicating that the first processor does not store any elements to send.

9. The method of claim 1, further comprising:
   receiving data from the second processor.

10. The method of claim 9 wherein the receiving data from the second processor comprises:
    receiving data in response to a get operation initiated by the first processor.

11. The method of claim 10 wherein the receiving data from the second processor comprises:
    receiving data in response to a put operation initiated by the second processor.

12. The method of claim 1 wherein the first processor controls the first bus; and the method further comprises:
    sending instructions to the second processor using a third bus, the third bus being a different bus than the first bus and the second bus.

13. A method, comprising:
    receiving over a first bus at a first processor, data from a media access controller having multiple ports;
    sending, from the first processor, signals over a second bus to the media access controller having multiple ports to control operation of the media access controller, the second bus being a different bus than the first bus;
    sending data over the second has from the first processor to a second processor sharing the media access controller having multiple ports with the first processor, wherein the sending data from the first processor to the second processor comprises at least one selected from the group of: (1) sending data in response to a put operation initiated by the first processor and (2) sending data in response to a get operation initiated by a second processor;
    receiving data at the first processor from the second processor sharing the media access controller having multiple ports, wherein the receiving data comprises at least one selected from the group of: (1) receiving data in response to a get operation initiated by the first processor, and (2) receiving data in response to a put operation initiated by the second processor.

14. The method of claim 13 wherein the put operation initiated by the first processor identifies a number of elements to send; and the method further comprises:
    transferring fewer than the identified number of elements if a buffer of the second processor does not have capacity to store the identified number of elements.

15. The method of claim 14 further comprising:
    receiving at the first processor from the second processor over a third bus, at least one signal identifying whether the buffer of the second processor has room to store another element, the third bus being a different bus than the first bus and the second bus.

16. The method of claim 15 wherein the get operation initiated by the first processor identifies a number of elements to receive; and the method further comprises:
    receiving fewer than the identified number of elements if a buffer of the second processor does not store at least the identified number of units.

17. The method of claim 16 further comprising:
    receiving at the first processor from the second processor over the third bus, at least one signal identifying whether the buffer of the second processor stores an elements to transfer.

* * * * *